April 10, 1962     V. E. MARK     3,029,116

PROJECTOR PLATFORM

Filed Sept. 14, 1959     2 Sheets-Sheet 1

INVENTOR
VENNICE E. MARK.

BY *Price and Heneveld*

ATTORNEYS

April 10, 1962  V. E. MARK  3,029,116
PROJECTOR PLATFORM
Filed Sept. 14, 1959  2 Sheets-Sheet 2

INVENTOR
VENNICE E. MARK
BY Price and Heneveld
ATTORNEYS

United States Patent Office 3,029,116
Patented Apr. 10, 1962

3,029,116
PROJECTOR PLATFORM
Vennice E. Mark, 1576 Fisk Road SE.,
East Grand Rapids, Mich.
Filed Sept. 14, 1959, Ser. No. 839,656
2 Claims. (Cl. 312—27)

This invention relates to a projector platform. More particularly, this invention relates to a combination projector support and a concealed storage means therefor.

This application is a continuation-in-part of my co-pending United States application Serial No. 645,237, filed March 11, 1957, issued on September 15, 1959 as United States Patent No. 2,904,380 and entitled Concealable Platform. My co-pending application discloses a furniture construction adapted to be used as a combination stand and storage facility for various types of equipment, such as typewriters. The nature of the invention is such that the dual purpose of the furniture is entirely camouflaged.

The present invention comprises an improvement over my co-pending application described above. The present invention is designed primarily for providing a support for a picture projector and a means for storing and concealing the projector and support therefor, the storage facility being incorporated into a desk, an end table, a night stand or a cabinet of any nature. For purposes of description, I shall refer to my invention as being used in conjunction with a picture projector although the invention is not limited to such a use since other pieces of equipment may be supported and concealed by the structure shown herein.

One of the objects of this invention is to provide a combination support and storage means which requires minimum effort on the operator's part to raise and lower the equipment to be supported. Its simplicity assures freedom from mechanical difficulty and durability in operation. It is sturdy enough to rigidly support a film or slide projector in an exposed position for use.

A further object of this invention is to provide a unit of furniture which is pleasing in outward appearance while concealing the projector therein. One of the end walls of this unit of furniture is adapted to move with the projector as it is moved from its exposed position of use to its position of storage, simplifying the removal of the projector from or returning it to storage position.

Further, this invention provides a second storage unit which may be used to store other articles, such as slides, bulbs, etc., which the operator of the projector must always have at hand when using the projector. The second storage area is positioned and cooperates with the other structure such that it is available for placing articles in and removing them therefrom only when the projector is being used. However, when the projector is stored, this second storage compartment is also completely hidden. This is desirable since such articles are only used when the projector is in use.

The invention also provides storage facilities which protect the equipment and its accessories from dust, dirt or physical injury.

These and other objects of this invention will become obvious to those skilled in the art of furniture construction upon reading the following specification in conjunction with the accompanying drawings, wherein.

Briefly, this invention relates to a combination work and storage unit comprising a housing having a storage chamber, a platform within the chamber and arms on each side of the platform each pivotally secured on one end to the platform and on the other end to the side walls of the housing. In one position the arms hold the platform flush with the top of the housing and in another position the arms hold the platform within the storage chamber. A stationary panel joins two sides of the housing, forming one end wall thereof. The platform engages and bears against this stationary panel when it is in its raised position, the stationary panel being positioned such that the arms are inclined upwardly toward the stationary panel when the platform engages it, the arms thereby being overcentered and the platform firmly supported. A second panel is secured to the other end of the platform. This panel is movable with the platform and comprises the other end wall of the housing. An enclosure means is mounted to the top of the second panel and to the platform itself, forming a second storage chamber which is usable when the platform is raised and hidden within the main storage chamber when the platform is positioned therein.

Figure 1:
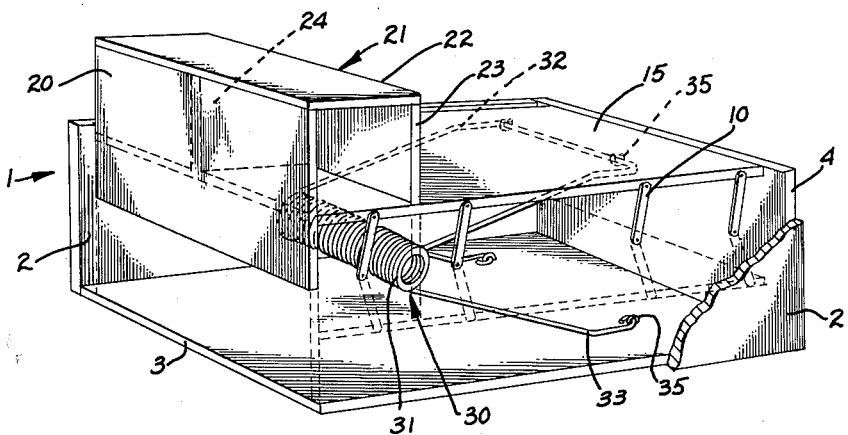
FIG. 1 is a perspective view of the furniture unit comprising this invention, one side thereof broken away and certain parts thereof being illustrated in phantom to better show the invention.
Figure 2:
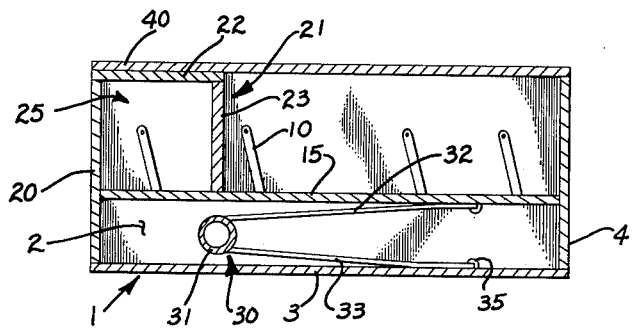
FIG. 2 is a cross section view taken along the plane II—II of FIG. 3.
Figure 3:
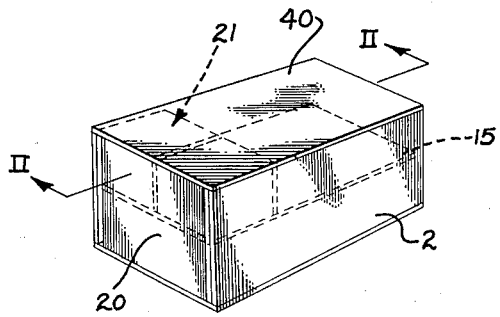
FIG. 3 is a perspective view of this furniture unit, certain hidden parts being illustrated to better show the invention.

Referring specifically to the drawings, the reference number 1 (FIG. 1) designates the housing comprising this furniture unit. The housing 1 includes a pair of side panels 2, a bottom panel 3 and a stationary end panel 4 (FIGS. 2 and 3). Pivotally secured to the inside faces of side panels 2 of housing 1 are a plurality of arms 10, four such arms being shown pivotally secured along the inside surfaces of each side panel at distances equally spaced from the bottom panel 3. The spacing of the arms lengthwise of the panels must be such that the arms can swing past each other in the same plane as the platform 15 is manipulated. Pivotally secured to the other ends of the arms 10 is the platform 15 (FIG. 1). It will be noted that, since the arms 10 are pivotally connected to both the side panels 2 of the housing 1 and to the platform 15, the platform 15 is movable within the housing 1. The stationary end panel 4 is positioned such that the arms 10 will extend upwardly toward the stationary panel 4 when the platform 15 bears against the stationary panel in raised position. This rigidly positions platform 15 as is shown clearly in FIG. 1. The position of the arms 10 and the platform 15 in lowered position within the housing 1 is shown in FIG. 1 by means of phantom lines.

Secured to the end of the platform 15, opposite from the end which engages the stationary panel 4, is a movable panel 20. The movable panel 20 is of a width less than the width of the housing 1, enabling it to move between the side panels 2 with the platform 15. The movable panel 20 comprises an end wall of the housing as shown in FIG. 3.

An enclosure means 21 is connected to the top portion of the movable panel 20 and the platform 15. This enclosure means 21 is shown to include a horizontal panel 22, vertical panel 23 and a divider panel 24. It should be understood that the structure of the enclosure means 21 may be varied without departing from the basic invention, the purpose of the enclosure member 21 being to form a second storage area 25 which is exposed when the platform 15 is in raised position and concealed within the housing 1 when the platform 15 is positioned therein. The enclosure means 21, together with the top of the movable panel 20 and a portion of the platform 15, constitutes this storage area 25.

Positioned between the bottom panel 3 and the bottom of the platform 15 is the spring means 30, clearly shown in FIGS. 1 and 2. Spring means 30 includes a coil 31, a loop-like upper arm 32 and lower arms 33 and is compressed between the bottom panel 3 and the platform 15 so that it tends to bias platform 15 upwardly at all times. Spring means 30 is pivotally secured to the bottom panel 3 and the platform 15 by means of brackets 35. It will be noted that the coil 31 of spring means 30 is free to rock vertically within the housing 1 as the platform 15 is moved between its two positions. When the platform 15 is in lowered position within the housing 1, as shown in FIG. 1, spring means 30 biases the platform 15 upwardly and against the stationary end panel 4. This assures that the platform 15 and movable panel 20 are firmly held within the housing 1.

A removable cover 40 is provided for the housing 1, the particular structure of the cover not being important to this invention. A cover 40 has been shown which may be lifted from the housing.

*Assembly and Operation*

A picture projector or similar piece of equipment may be mounted on the exposed top surface of the platform 15. The platform 15 is secured within the housing 1 by means of the arms 10 which are pivotally secured to the side panels 2 of housing 1 and also pivotally secured at their other end to the platform 15. The movable panel 20 is secured to the end of platform 15. The enclosure means 21 is secured to the movable panel 20 and the platform 15, forming a second storage area 25.

It will be noted from FIG. 3 that the entire apparatus is concealed within the housing 1. Upon removing the cover 40 from the top of the housing 1, the movable panel 20 may be pulled outwardly. The initial force pivots the platform 15 from the position shown in FIG. 2, slightly downwardly, the arms 10 moving to a vertical position. The platform 15 is then pivoted outwardly and upwardly and once again downwardly when the arms again pass through a vertical position. The weight of the equipment on the platform 15 will overcome the force of spring means 30 and the platform is positioned for use when it engages stationary end panel 4. In this position, the movable panel 20, the platform 15, and the enclosure means 21 form a second storage chamber 25 which may be used to store articles used only when the equipment mounted on platform 15 is used, such as slides, bulbs, etc.

A reversal of these steps moves the projector or other equipment back within the housing 1, also positioning the horizontal panel 22 of enclosure means 21 within the housing. The movable panel comprises one end wall of the housing when the platform 15 is in this position.

It will be noted that the structure of this invention provides a combination support and storage unit for various types of equipment. A second storage chamber is provided for use when the piece of equipment is in use, thus being especially adapted for storing articles used only at that time. An end wall is provided which moves with the platform, thus eliminating the necessity of otherwise removing a wall. The unit is neat and pleasing in appearance and completely camouflages the fact that it is a storage and support unit. The unit provides a compact dust free storage unit requiring minimal time and effort to open and close. The structure is simple yet sufficiently sturdy and rigid to execute the objects set forth herein.

The use of four arms 10 on each side of the platform 15 stabilizes the platform preventing it from twisting. This makes the manipulation of the platform easy and positive. It eliminates interference between the platform and the sides of the cabinet which prevents free smooth swinging of the platform. When the number of arms employed is reduced this stability is markedly reduced to the detriment of the equipment.

While they have not been illustrated, it will be understood that legs may be provided beneath the unit to elevate its top surface to a convenient operating level. This however is merely a routine change of structure.

*Modifications*

Figure 4:
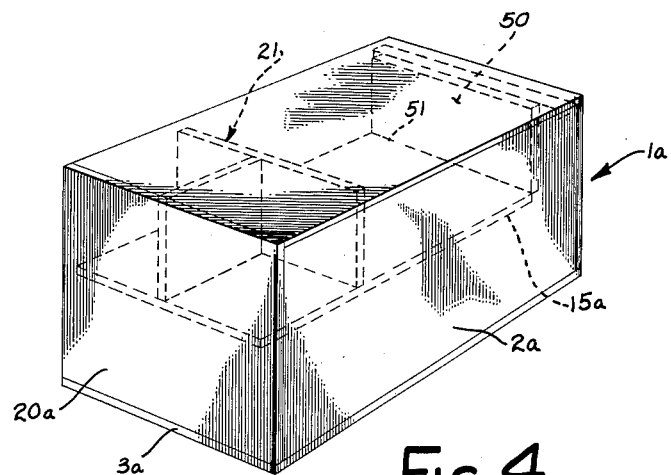
FIG. 4 is a perspective view similar to FIG. 3, a modification of the furniture unit being shown.

A modification of this furniture unit is shown in FIG. 4. Again, a housing 1a is provided, having side walls 2a, a bottom 3a and a back stationary panel 4a. A platform 15a (shown in phantom) is mounted within the housing 1a as described hereinbefore, an enclosure means 21a secured thereto and movable with the platform. All of these elements are generally the same as those described in detail hereinbefore. There are two differences however. The first difference is that the movable panel 20a is of a size such that it bears against and engages the sides 2a of the housing 1a rather than moving between them. Consequently, the movable panel 20a provides the limiting points for the movement of the platform 15a. That is, both when the platform is raised to a position generally flush with the top of the housing 1a and when it is positioned within the housing, the movable panel 20a bears against the sides 2a of the housing as shown in FIG. 4. The operation of the furniture unit remains the same except for this difference.

It will also be noted that a support panel 50 is shown in phantom in FIG. 4, hinged to the platform 15a at the opposite end from the movable panel 20a. Such a support panel 50 is hidden within the housing 1a when the platform 15a is positioned therein and may be pivoted to lie in the same plane as platform 15a when the platform is positioned generally flush with the top of the housing.

Figure 5:
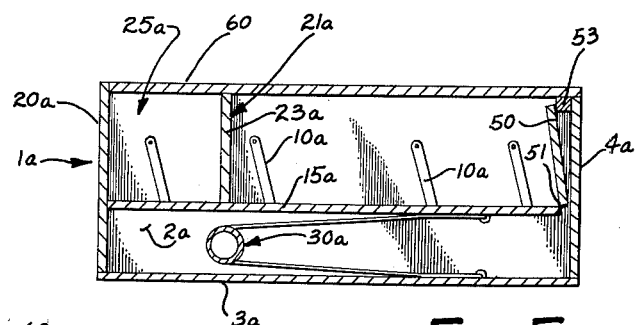
FIG. 5 is a cross section view similar to FIG. 2, another modification of the furniture unit being shown.
Figure 6:
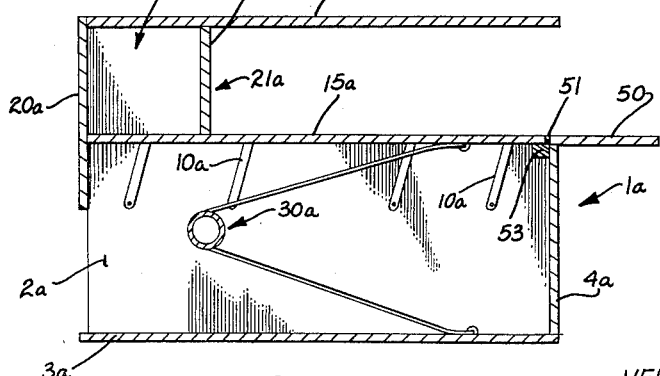
FIG. 6 is a cross section view similar to FIG. 5, the furniture unit being shown with the platform in raised position.

Still a further modification is shown in FIGS. 5 and 6. Here the top platform 60 is secured to the movable panel 20a and the upright member 23a of enclosure means 21a. It will be noted that the top platform 60 comprises the cover for the housing 1a in this modification. Thus the second storage area 25a and the support panel 50, together with the projector or other equipment positioned thereon are all hidden within the housing 1a when the platform 15a is positioned therein as shown in FIG. 5. Upon moving the movable panel 20a outwardly, with the aid of spring means 30a (which is the same as the spring means 30 described hereinbefore) the platform 15a is positioned generally flush with the top of the housing 1a as shown in FIG. 6, the arms 10a also functioning in the same manner as described hereinbefore. It will be noted that in this position the support panel 50 may be pivoted about its hinge 51 to a position generally parallel with platform 15a. The projector or other equipment may be moved onto the support panel 50 for use. A brace 53 is provided at the top of stationary panel 4a for the platform 15a to rest upon.

In this modification, both the cover and one end wall of the housing move with the platform. It should be realized that this modification may be employed in the absence of the modification shown in FIG. 4, that is, without the movable panel engaging the sides of the housing.

While only certain embodiments of this invention have been shown, it may be possible to practice this invention through the utilization of certain other embodiments. All such embodiments are to be included within the spirit and scope of this invention unless the appended claims expressly state otherwise.

I claim:

1. A combination work and storage unit, comprising: a housing having side walls and a storage chamber; a platform within said chamber; arms on each side of said platform each pivotally mounted on one end to said platform and on the other end to said side walls of said housing, in one position said arms holding said platform generally flush with the top of said housing and in another position said arms holding said platform within said storage chamber; and a panel secured to one end of said platform, said panel movable with said platform and forming one end wall for and closing said housing when said platform is positioned within said housing; a top platform secured to the top of said movable panel, said top platform lying above said platform and in a plane generally parallel therewith, said top platform forming a cover for said housing when said platform is positioned within said housing; an enclosure means joining said top platform and said platform forming a second storage chamber exposed for use when said platform is positioned generally flush with said top of said housing and concealed within said housing when said platform is positioned therein; and a support panel hinged to the end of said platform opposite from said movable panel and adapted to be positioned in the same plane as said platform when said platform is positioned substantially flush with said top of said housing and folded within said housing when said platform is positioned therein.

2. A combination work and storage unit, comprising: a housing having side walls and a storage chamber; a platform within said chamber; arms on each side of said platform each pivotally mounted on one end to said platform and on the other end to said side walls of said housing, in one position said arms holding said platform generally flush with the top of said housing and in another position said arms holding said platform within said storage chamber; a spring means positioned between said platform and the bottom of said housing, said spring means biasing said platform upwardly; and a panel secured to one end of said platform, said panel movable with said platform and forming one end wall for and closing said housing when said platform is positioned within said housing; a top platform secured to the top of said movable panel, said top platform lying above said platform and in a plane generally parallel therewith, said top platform forming a cover for said housing when said platform is positioned within said housing; an enclosure means joining said top platform and said platform forming a second storage chamber exposed for use when said platform is positioned generally flush with said top of said housing and concealed within said housing when said platform is positioned therein; and a support panel hinged to the end of said platform opposite from said movable panel and adapted to be positioned in the same plane as said platform when said platform is positioned substantially flush with said top of said housing and folded within said housing when said platform is positioned therein.

References Cited in the file of this patent
UNITED STATES PATENTS

| | | |
|---|---|---|
| 490,127 | Sigafoos | Jan. 17, 1893 |
| 735,312 | Stokes | Aug. 4, 1903 |
| 1,112,733 | Umphery | Oct. 6, 1914 |
| 1,388,243 | Dragner | Aug. 23, 1921 |
| 1,699,740 | Kusterer et al. | Jan. 22, 1929 |
| 1,845,202 | Shriver | Feb. 16, 1932 |
| 2,358,917 | Emde | Sept. 26, 1944 |
| 2,588,163 | Ristenpart | Mar. 4, 1952 |
| 2,590,341 | Nabholz | Mar. 25, 1952 |
| 2,607,651 | Preuss | Aug. 19, 1952 |
| 2,643,167 | Wade | June 23, 1953 |

UNITED STATES PATENT OFFICE
CERTIFICATE OF CORRECTION

Patent No. 3,029,116                      April 10, 1962

Vennice E. Mark

It is hereby certified that error appears in the above numbered patent requiring correction and that the said Letters Patent should read as corrected below.

Column 3, line 43, after "upwardly" insert -- then inwardly --.

Signed and sealed this 4th day of September 1962.

(SEAL)
Attest:

ERNEST W. SWIDER                      DAVID L. LADD
Attesting Officer                      Commissioner of Patents